J. F. COMLY.
NUT LOCK.
APPLICATION FILED FEB. 19, 1920.
1,344,534.
Patented June 22, 1920.
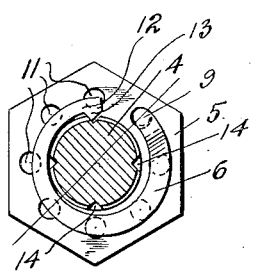
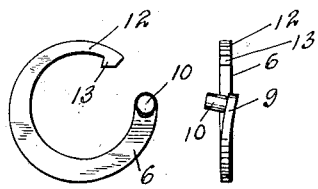
Fig 3. Fig 4. Fig 5.
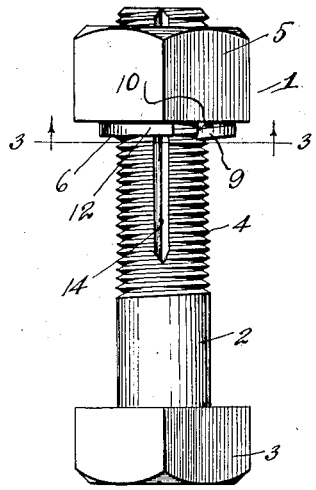
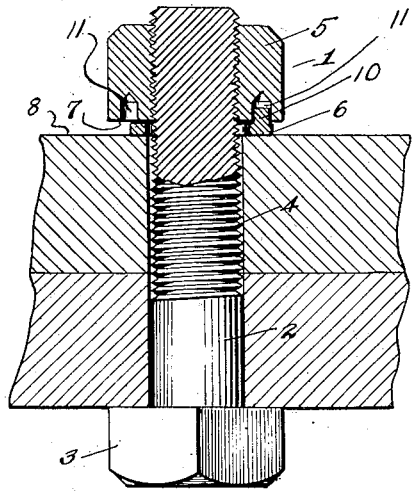
Fig 1. Fig 2.
Inventor
James F. Comly
Witness
A. Sindell
By
C. C. Shepherd
Attorney

UNITED STATES PATENT OFFICE.

JAMES F. COMLY, OF NEW LEXINGTON, OHIO.

NUT-LOCK.

1,344,534.  Specification of Letters Patent.  Patented June 22, 1920.

Application filed February 19, 1920. Serial No. 359,921.

*To all whom it may concern:*

Be it known that I, JAMES F. COMLY, a citizen of the United States, residing at New Lexington, in the county of Perry and State of Ohio, have invented certain new and useful Improvements in Nut-Locks, of which the following is a specification.

This invention relates to nut locks, and has for its object to provide a nut lock which is characterized by its general efficiency and simple construction, and wherein the parts are so formed that the same may be used repeatedly without destroying or marring any one or more parts in effecting the removal of a nut from its locked position upon the threaded shank of a bolt.

Another object of the invention resides in a nut lock structure wherein is embodied a spring washer member, which is of split construction and its ends are normally adapted to lie in slightly offset relation, so that when a nut is threaded into engagement with the washer member the same will be placed under compression in the usual manner in order to retain the nut against undue rotation by reason of the friction exercised against the same by the resiliency of the washer member, and to supplement this construction by forming one of the ends of the washer member with a fixed stud which is adapted to be positioned within an opening formed in the inner face of the nut, the other or opposite end of the washer member being of reduced thickness in order to be radially resilient, and this latter end is provided with an inwardly extending V shaped projection, which is adapted to engage with a longitudinal slot formed in the shank of the bolt upon which the nut is threaded, the construction being such that the washer member when operatively positioned will positively lock the nut in position upon the bolt without relying solely upon the agency of friction, as is the case in the ordinary split washer, and by forming the projection end of the washer member resilient it is possible to remove the nut from the bolt without destroying or diminishing the washer member. By this construction a lock nut is provided which will be positive in operation, simple and effective and may be used repeatedly without incurring the use of replaced or new parts.

For a further understanding of the invention, reference is to be had to the following description and to the accompanying drawing, in which similar characters of reference denote like and corresponding parts, and in which:

Figure 1 is a side elevation of the nut lock comprising the present invention,

Fig. 2 is a vertical sectional view taken therethrough,

Fig. 3 is a transverse horizontal sectional view taken along the line 3—3 of Fig. 1, Fig. 4 is a side elevation of the washer member, and Fig. 5 is an edge view of said member.

Referring more particularly to the details of the invention, as the latter are illustrated in the drawing, the numeral 1 designates my improved nut lock structure in its entirety. This structure consists of a suitable form of bolt or its equivalent 2, which comprises a head 3 and an elongated threaded shank 4. A nut 5 of any suitable construction is threadedly carried by the shank 4 and is adjustable thereon in the usual manner. To retain the nut in clamped relationship with the objects with which the structure 1 is engaged, use is made of a spring washer member 6. This member is preferably in the form of a split ring and is adapted to be positioned around the shank 4 and between the inner face 7 of the nut 5 and the outer surface of the objects 8. Preferably, the member 6 has its ends spaced and slightly offset, so that when the nut is threaded into its clamping position, said washer member will be placed under compression, this causes the ends of said member to be forced in substantially the same plane, thereby causing the ends to frictionally press against the face 7 of the nut, in order that the friction exercised thereby will tend to maintain the nut against undue rotation, substantially after the fashion of the split washer construction of common usage.

The present invention consists essentially in the peculiar formation of the washer member and in the means whereby the same will be caused to positively lock the nut in connection with the shank of the bolt. To this end, the washer member 6 has its end 9 provided with an inwardly projecting rigid stud 10, which protrudes toward the inner face of the nut 5 and is adapted to be seated within any one of a plurality of circumferentially arranged pockets 11 formed in the face 7. The other end 12 of the washer member is reduced in width relative to the end 9, as is clearly shown in Fig. 4, and by so reducing the end 12 the same will be rendered substantially resilient. An inwardly directed V shaped projection 13 is provided upon the end 12 and is arranged to engage with any one of a plurality of elongated slots 14 provided longitudinally in the threads of the bolt shank 4.

From the foregoing it will be manifest that when the parts of the nut structure are operatively assembled the washer member will be so positioned that the stud 10 will project into one of the pockets 11 of the nut 5, the opposite end of the washer member being resilient, a construction is provided which will maintain the projection 13 within one of the elongated slots 14. Since the washer member thereof is positively connected with both the bolt and the nut it will be manifest that relative movement on the part of the nut with respect to the bolt will be prevented. The present invention consists chiefly in tapering or reducing the washer member so as to provide the resilient end 12, which is adapted to resiliently project the portion 13 into the slots 14. Manifestly, by means of this construction the parts of the nut lock may be securely and positively held together, and yet when it is necessary to remove the nut from its locked position, the operation may be accomplished without destroying the utility of the washer member. It is in this particular feature that the novelty of the present invention is believed to reside as analogous washers of the prior art have been so formed that their destruction is necessary in order to remove a coöperating nut from engagement therewith. By the use of the present invention the washer member 6, on the other hand, may be used repeatedly and will function positively to hold the nut 5 in a locked position under conditions of actual use.

What is claimed is:

A nut lock structure comprising a bolt having a longitudinal locking groove provided in its threaded shank, a nut threaded upon said shank and having a pocket formed in its inner face, a washer member for locking said nut in an applied position upon said bolt shank, said member being formed to include a split resilient body of ring shaped formation, one of the ends of said member being formed with a rigid element capable of occupying said pocket, the other end of said member being gradually reduced in thickness to render the same resilient in a plane transverse to the longitudinal axis of the bolt, a projection formed with said resilient end and capable of removably occupying said groove to maintain said nut in an adjusted position upon said bolt, and the ends of said washer member being relatively offset to cause said member to be placed under tension when the same is forced into engagement with a coöperative surface by the threaded adjustment of the nut upon said bolt.

In testimony whereof I affix my signature.

JAMES F. COMLY.